United States Patent
Han

(10) Patent No.: US 7,667,773 B2
(45) Date of Patent: Feb. 23, 2010

(54) APPARATUS AND METHOD OF MOTION-COMPENSATION ADAPTIVE DEINTERLACING

(75) Inventor: Dongil Han, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 623 days.

(21) Appl. No.: 11/149,197

(22) Filed: Jun. 10, 2005

(65) Prior Publication Data

US 2006/0023119 A1  Feb. 2, 2006

(30) Foreign Application Priority Data

Jul. 28, 2004 (KR) .................... 10-2004-0059062

(51) Int. Cl.
H04N 7/01 (2006.01)
H04N 5/14 (2006.01)
H04N 9/64 (2006.01)
G06K 9/40 (2006.01)

(52) U.S. Cl. ................ 348/452; 348/448; 348/699; 348/700; 382/261; 382/266

(58) Field of Classification Search ........... 348/448, 348/452, 699–701; 382/260, 261, 266
See application file for complete search history.

(56) References Cited

U.S. PATENT DOCUMENTS

| | | | | |
|---|---|---|---|---|
| 5,467,138 A * | 11/1995 | Gove | .................... | 348/452 |
| 5,546,130 A * | 8/1996 | Hackett et al. | .................... | 348/447 |
| 5,642,170 A * | 6/1997 | Hackett et al. | .................... | 348/459 |
| 5,661,525 A * | 8/1997 | Kovacevic et al. | .................... | 348/452 |
| 5,671,018 A * | 9/1997 | Ohara et al. | .................... | 348/452 |
| 6,061,100 A * | 5/2000 | Ward et al. | .................... | 348/607 |
| 6,181,382 B1 * | 1/2001 | Kieu et al. | .................... | 348/459 |
| 6,262,773 B1 * | 7/2001 | Westerman | .................... | 348/448 |
| 6,421,090 B1 * | 7/2002 | Jiang et al. | .................... | 348/452 |
| 6,459,455 B1 * | 10/2002 | Jiang et al. | .................... | 348/452 |
| 6,577,345 B1 * | 6/2003 | Lim et al. | .................... | 348/452 |
| 6,661,464 B1 * | 12/2003 | Kokkosoulis et al. | .................... | 348/448 |
| 6,731,342 B2 * | 5/2004 | Shin et al. | .................... | 348/452 |
| 6,757,022 B2 * | 6/2004 | Wredenhagen et al. | .................... | 348/452 |
| 6,839,094 B2 * | 1/2005 | Tang et al. | .................... | 348/607 |
| 6,900,846 B2 * | 5/2005 | Lee et al. | .................... | 348/459 |
| 6,992,725 B2 * | 1/2006 | Mohsenian | .................... | 348/448 |
| 7,012,649 B2 * | 3/2006 | Michel | .................... | 348/448 |

(Continued)

FOREIGN PATENT DOCUMENTS

JP  10-108218  4/1998

(Continued)

Primary Examiner—Brian P Yenke
(74) Attorney, Agent, or Firm—Stanzione & Kim LLP

(57) ABSTRACT

An apparatus and method of motion-compensation adaptive deinterlacing. The method includes detecting whether an input image is a still image using information regarding the input image stored in a memory, estimating a motion of a pixel to be interpolated when the input image is not a still image, and interpolating the pixel to be interpolated using one of using pixel values of previous and next fields with respect to a reference field including the pixel to be interpolated when the input image is the still image, the estimated motion information when the input image is not a still image and has no vertical fast motion, and pixel values of the reference field when the input image has a vertical fast motion.

15 Claims, 10 Drawing Sheets

U.S. PATENT DOCUMENTS

| | | | |
|---|---|---|---|
| 7,042,512 B2 * | 5/2006 | Yang et al. | 348/452 |
| 7,075,580 B2 * | 7/2006 | Jiang | 348/448 |
| 7,098,957 B2 * | 8/2006 | Kim et al. | 348/452 |
| 7,116,828 B2 * | 10/2006 | Wells | 382/233 |
| 7,142,247 B2 * | 11/2006 | Jung | 348/452 |
| 7,193,655 B2 * | 3/2007 | Nicolas | 348/448 |
| 7,242,819 B2 * | 7/2007 | Jiang | 382/300 |
| 7,265,791 B2 * | 9/2007 | Song et al. | 348/448 |
| 7,280,161 B2 * | 10/2007 | Satou et al. | 348/701 |
| 7,362,376 B2 * | 4/2008 | Winger et al. | 348/448 |
| 7,362,377 B2 * | 4/2008 | Caviedes | 348/452 |
| 7,362,379 B2 * | 4/2008 | Michel et al. | 348/452 |
| 7,375,763 B2 * | 5/2008 | Alfonso et al. | 348/448 |
| 7,388,617 B2 * | 6/2008 | Kasahara et al. | 348/448 |
| 2005/0179814 A1 * | 8/2005 | Pau et al. | 348/448 |
| 2007/0177056 A1 * | 8/2007 | Zhou et al. | 348/452 |

FOREIGN PATENT DOCUMENTS

| | | |
|---|---|---|
| KR | 100272582 B1 | 8/2000 |
| KR | 100292474 B1 | 3/2001 |
| KR | 2002-1951 A | 1/2002 |

* cited by examiner

APPARATUS AND METHOD OF MOTION-COMPENSATION ADAPTIVE DEINTERLACING

CROSS-REFERENCE TO RELATED APPLICATIONS

This application claims the benefit under 35 U.S.C. § 119 of Korean Patent Application No. 2004-59062, filed on Jul. 28, 2004, in the Korean Intellectual Property Office, the disclosure of which is incorporated herein in its entirety by reference.

BACKGROUND OF THE INVENTION

1. Field of the Invention

The present general inventive concept relates to an apparatus and method of motion-compensation adaptive deinterlacing, and more particularly, to an apparatus and method of motion-compensation adaptive deinterlacing in which motion adaptive deinterlacing and motion-compensation deinterlacing are combined to convert interlaced video into progressive scan video.

2. Description of the Related Art

The recent development of digital TV technology and large-screen display devices, such as plasma digital panel (PDP) TVs and projection TVs using digital lighting processing (DLP), liquid crystal display (LCD), and liquid crystal on silicon (LCoS), allows users to enjoy high-definition (HD) video. With the wide spread of such digital video devices, an environment where analog video devices, such as traditional TVs, and digital video devices coexist has become commonplace. Thus, processing with respect to conventional analog NTSC (National Television Systems Committee) screens or standard definition (SD) screens is also required. Since conventional analog TV video generally uses interlaced scanning, a resolution or scanning rate should be improved to adapt to an HD screen. To this end, conversion from the interlaced scanning to progressive scanning is effective.

The interlaced scanning and the progressive scanning are classified according to a method of constructing a frame. In the interlaced scanning, each of two fields is composed of odd or even scan lines and a frame is constructed by interlacing the even scan lines from one field between the odd scan lines from the other field. In other words, the odd scan lines are scanned for one field (a top field), the even scan lines are scanned for the other field (a bottom field), and a frame is constructed using the two fields. On the other hand, in the progressive scanning, a frame is constructed by progressively scanning the lines of a video signal. The progressive scanning has less flicker than the interlaced scanning.

Various algorithms have been developed for conversion from the interlaced scanning to the progressive scanning. For example, there are an algorithm that repetitively uses line information of a current field, an algorithm that inserts line information of a previous field, an algorithm that extracts an edge from video information of a current field and performs interpolation along an edge direction of the edge, a motion-adaptive deinterlacing algorithm, and a motion compensation algorithm. Here, deinterlacing refers to a process of converting interlaced video into progressive scan video.

The algorithm that repetitively uses the line information of the current field is often used in the progressive scanning on a computer screen, but may output step pattern images in a diagonal still picture. The algorithm that inserts the line information of the previous field is also mainly used in the progressive scanning on the computer screen, but may output a double image.

FIGS. 1A through 1C are views illustrating conventional algorithms for converting interlaced video into progressive scan video. FIG. 1A is a view illustrating a conventional deinterlacing algorithm using interpolation along an edge direction. FIG. 1B is a view illustrating a conventional motion adaptive deinterlacing algorithm. FIG. 1C is a view illustrating a conventional motion-compensation deinterlacing algorithm.

As illustrated in FIG. 1A, the conventional deinterlacing algorithm using interpolation along the edge direction does not create a pixel through simple linear interpolation, but instead detects the edge direction and performs interpolation along the detected edge direction with respect to a pixel p(x,y). The conventional deinterlacing algorithm of FIG. 1A removes artifacts from final output video using interpolation along the edge direction and can be implemented with simple hardware. However, in the case of a still image, since this algorithm provides an image quality that is inferior to the conventional motion adaptive deinterlacing algorithm or the conventional motion-compensation deinterlacing algorithm, it is usually combined with the conventional motion adaptive deinterlacing algorithm or the conventional motion-compensation deinterlacing algorithm in HD digital TV applications.

Referring to FIG. 1B, the conventional motion adaptive deinterlacing algorithm determines whether a pixel $c[t(n-2)]$ to be interpolated is moving using a plurality of input fields (i.e. first, second, and third fields) and performs interpolation using pixel information $a_1[t(n-2)]$, $a[t(n-2)]$, $a_r[t(n-2)]$, $b_1[t(n-2)]$, $b[t(n-2)]$, and $b_r[t(n-2)]$ of a previous field if the pixel $c[t(n-2)]$ to be interpolated is static, or using video information $a_1[t(n)]$, $a[t(n)]$, $a_r[t(n)]$, $b_1[t(n)]$, $b[t(n)]$, and $b_r[t(n)]$ of lines above and below a line including the pixel $c[t(n-2)]$ to be interpolated in a current field if the pixel $c[t(n-2)]$ to be interpolated is moving. The conventional motion adaptive deinterlacing algorithm can be easily configured with hardware and offers a good price/performance ratio. However, when there is a motion in an image, the output image quality of the conventional motion adaptive deinterlacing algorithm is inferior to that of the conventional motion-compensation deinterlacting algorithm. Moreover, since a pixel should be synthesized only using information within a frame, if there is a little motion, it is impossible to take full advantage of given information.

Referring to FIG. 1C, the conventional motion-compensation deinterlacing algorithm extracts motion information $D(x,t)$ according to a searching area SA from a previous field or a next field of a current field including a pixel to be interpolated and performs interpolation in a direction of motion. Since the performance of the motion-compensation deinterlacing algorithm depends on accurate motion detection, the optimal image quality can be assured with accurate motion estimation. However, the actual hardware configuration for extracting motion information is difficult to implement. Moreover, since inaccurate motion estimation directly leads to quality degradation, it is not easy to use the conventional motion-compensation deinterlacing algorithm in actual applications.

SUMMARY OF THE INVENTION

The present general inventive concept provides an apparatus and method of motion-compensation adaptive deinterlacing, in which motion adaptive deinterlacing is used when there is no motion in an image and motion-compensation deinterlacing is used when there is horizontal motion or a vertical slow motion in an image, thereby providing optimal image quality.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing a motion-compensation adaptive deinterlacing apparatus. The motion-compensation adaptive deinterlacing apparatus includes a still image detection unit, a motion estimation unit, a pixel insertion unit, a motion compensation unit, a spatial interpolation unit, and a switching unit. The still image detection unit detects whether an input image is a still image. The motion estimation unit estimates motion of a pixel to be interpolated when the input image is not a still image. The pixel insertion unit interpolates the pixel to be interpolated using pixels in previous and next fields with respect to a reference field including the pixel to be interpolated when the input image is a still image. The motion compensation unit interpolates the pixel to be interpolated using motion information estimated by the motion estimation unit when the input image is not the still image and has no vertical fast motion. The spatial interpolation unit interpolates the pixel to be interpolated using pixels of the reference field including the pixel to be interpolated when the input image has the vertical fast motion. The switching unit interpolates the pixel to be interpolated using one of interpolation values of the pixel insertion unit, the motion compensation unit, and the spatial interpolation unit according to results from the still image detection unit and the motion estimation unit.

The foregoing and/or other aspects of the present general inventive concept may also be achieved by providing a method of motion-compensation adaptive deinterlacing, the method comprising detecting whether an input image is a still image using information regarding the input image stored in a memory, estimating motion of a pixel to be interpolated when the input image is not a still image, and interpolating the pixel to be interpolated using one of pixel values of previous and next fields with respect to a reference field including the pixel to be interpolated when the input image is the still image, the estimated motion information when the input image is not the still image and has no vertical fast motion, and pixel values of the reference field when the input image has the vertical fast motion.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
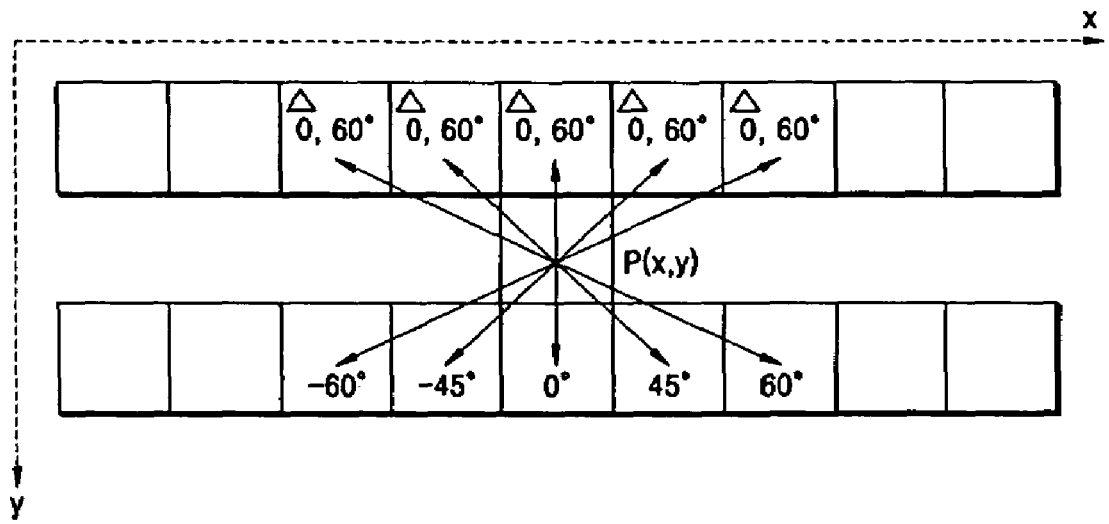
FIGS. 1A through 1C are views illustrating conventional algorithms for converting interlaced video into progressive scan video.
Figure 1B:
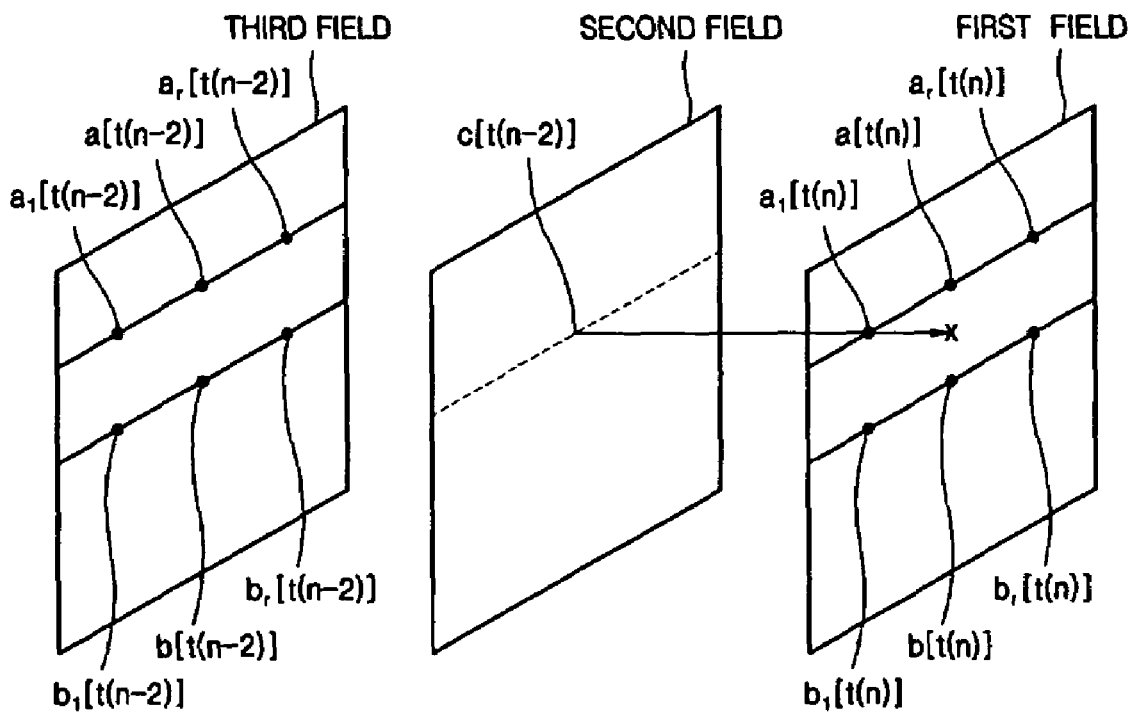
Figure 1C:
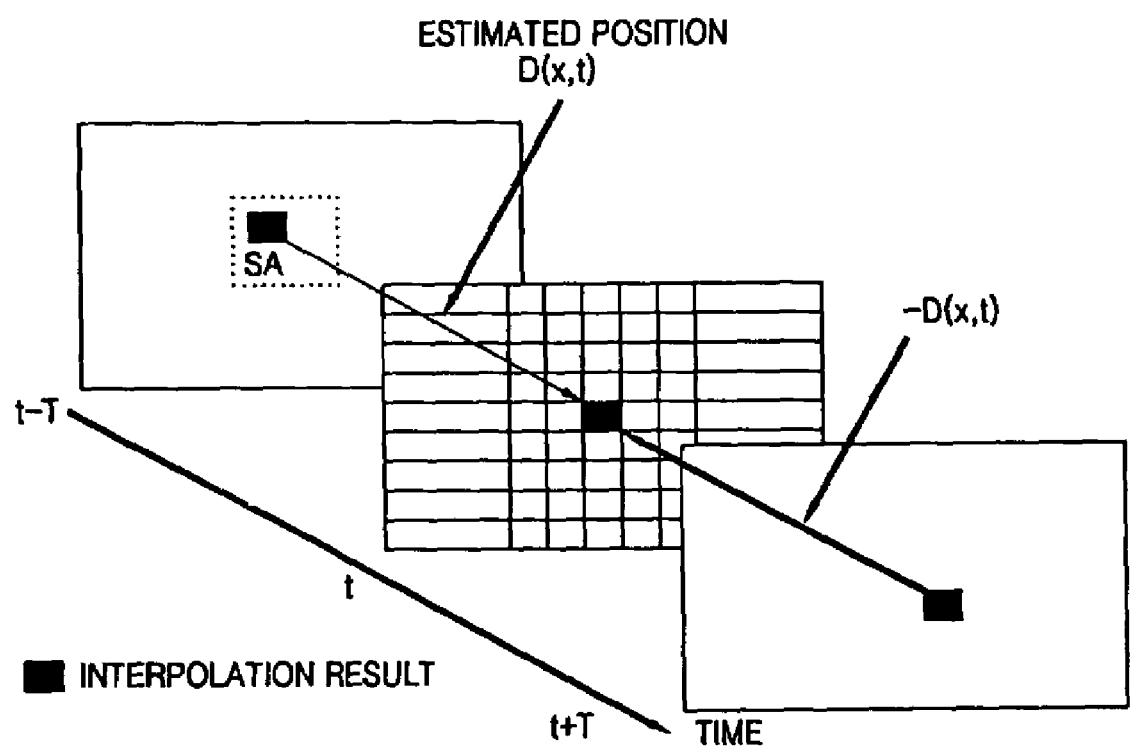

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
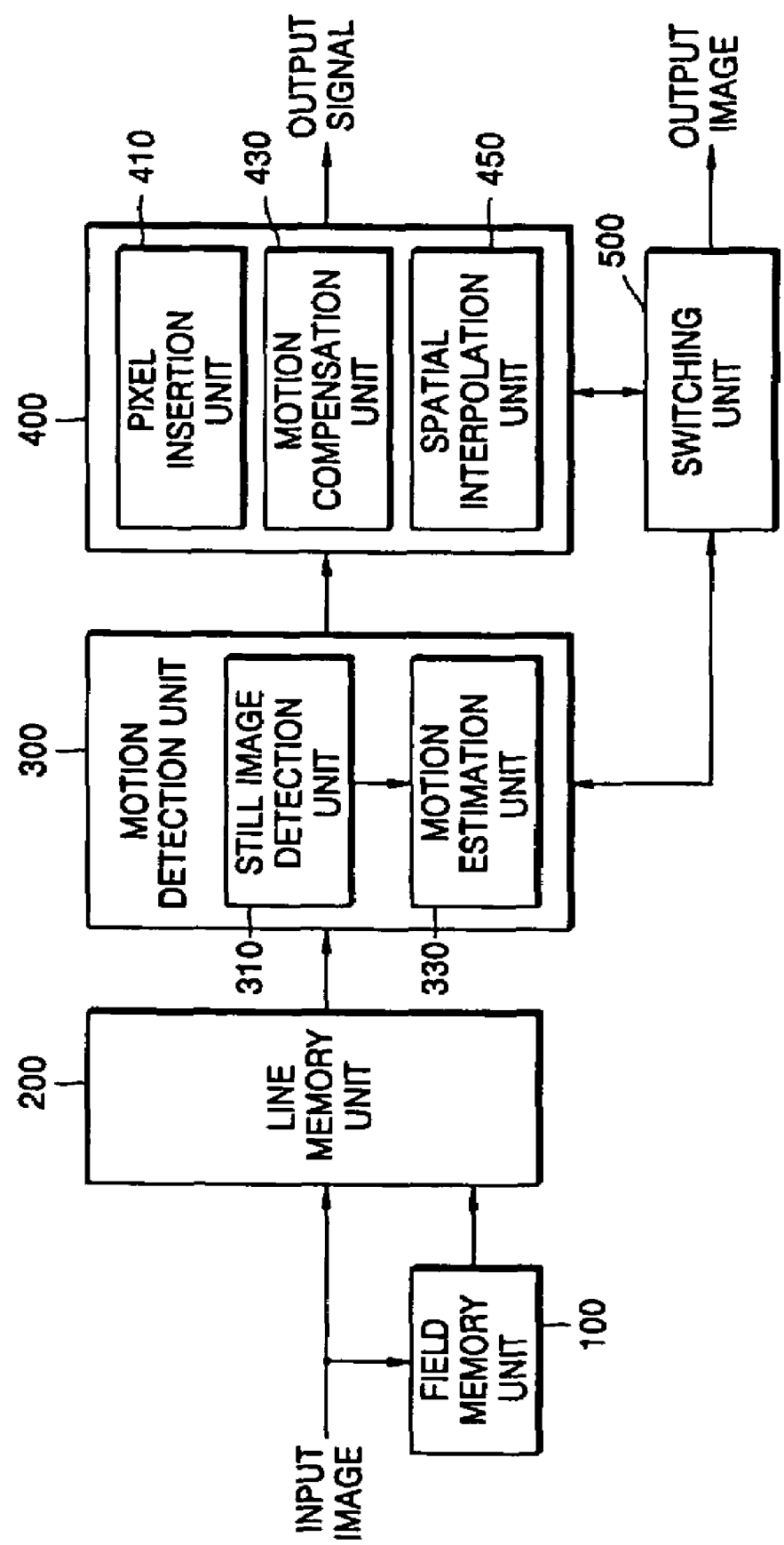
FIG. 2 is a block diagram illustrating a motion-compensation adaptive deinterlacing apparatus according to an embodiment of the present general inventive concept.

FIG. 2 is a block diagram illustrating a motion-compensation adaptive deinterlacing apparatus according to an embodiment of the present general inventive concept.

Referring to FIG. 2, the motion-compensation adaptive deinterlacing apparatus includes a field memory unit 100, a line memory unit 200, a motion detection unit 300, an interpolation unit 400, and a switching unit 500. The motion detection unit 300 includes a still image detection unit 310 and a motion estimation unit 330. The interpolation unit 40 includes a pixel insertion unit 410, a motion compensation unit 430, and a spatial interpolation unit 450.

The field memory unit 100 stores fields including input interlaced video.

The line memory unit 200 stores input video. The line memory unit 200 includes a plurality of line memories, the number of which can be determined based on performance and cost requirements. Data stored in the line memory unit 200 is used to detect whether an input image of the input video is a still image or to estimate a motion of the image by the motion detection unit 300.

The motion detection unit 300 includes the still image detection unit 310 and the motion estimation unit 330. The still image detection unit 310 detects whether a pixel to be interpolated is in a static area of the input image. The still image detection unit 310 detects whether the pixel to be interpolated is in the static area by calculating a correlation between a pixel in a current reference field and a pixel in another field using images of fields stored in the field memory unit 100. The motion estimation unit 330 estimates a motion vector in the image based on video information of the fields stored in the field memory unit 100 and provides motion information to the motion compensation unit 430 to interpolate the pixel along a motion direction according to the estimated motion vector.

The interpolation unit 400 includes the pixel insertion unit 410, the motion compensation unit 430, and the spatial interpolation unit 450. If a result of detection made by the still image detection unit 310 indicates that the pixel to be interpolated is in the static area of the input image, the pixel insertion unit 410 inserts a pixel corresponding to the pixel to be interpolated in a previous or next field with respect to a current field including the pixel to be interpolated or the mean of pixel values of the corresponding pixels in the previous and next fields as the pixel to be interpolated.

The motion compensation unit 430 performs interpolation along the motion direction using the motion information provided from the motion estimation unit 330. The motion compensation unit 430 performs the interpolation when there is a horizontal motion or a vertical slow motion in the image.

When accurate pixel interpolation cannot be performed by the motion compensation unit 430, the spatial interpolation unit 450 detects the existence of an edge and an edge direction based on correlations between a line including the pixel to be interpolated and lines above and below the line including the pixel to be interpolated. Here, the edge indicates a boundary region between objects included in the input image or a discontinuous portion taking the form of a gray-level line. When there is a large vertical motion in a current image or a portion that has not been included in a previous image is newly added to the current image, the motion information provided from the motion estimation unit 330 may not be accurate. Thus, the spatial interpolation unit 450, instead of the motion compensation unit 430, performs interpolation for the accurate pixel interpolation.

The switching unit 500 causes the still image detection unit 310 to operate when an image is input and the motion estimation unit 330 to operate when a result of the detection made by the still image detection unit 310 indicates that the input image is not the still image.

The switching unit 500 performs switching to cause one of the pixel insertion unit 410, the motion compensation unit 430, and the spatial interpolation unit 450 of the interpolation unit 400 to operate according to information provided from the motion detection unit 300. In other words, when the result of detection made by the still image detection unit 310 of the motion detection unit 300 indicates that the pixel to be interpolated is in the static area of the input image, the switching unit 500 causes the pixel insertion unit 410 to operate. When the result of the detection indicates that there is the horizontal motion or the vertical slow motion in the input image, the switching unit 500 causes the motion compensation unit 430 to operate according to the motion information provided from the motion estimation unit 330. When the motion estimation made by the motion estimation unit 330 is not accurate, i.e., there is the large vertical motion in the input image or a new addition to the input image, the switching unit 500 causes the spatial interpolation unit 450 to operate.

Figure 3A:
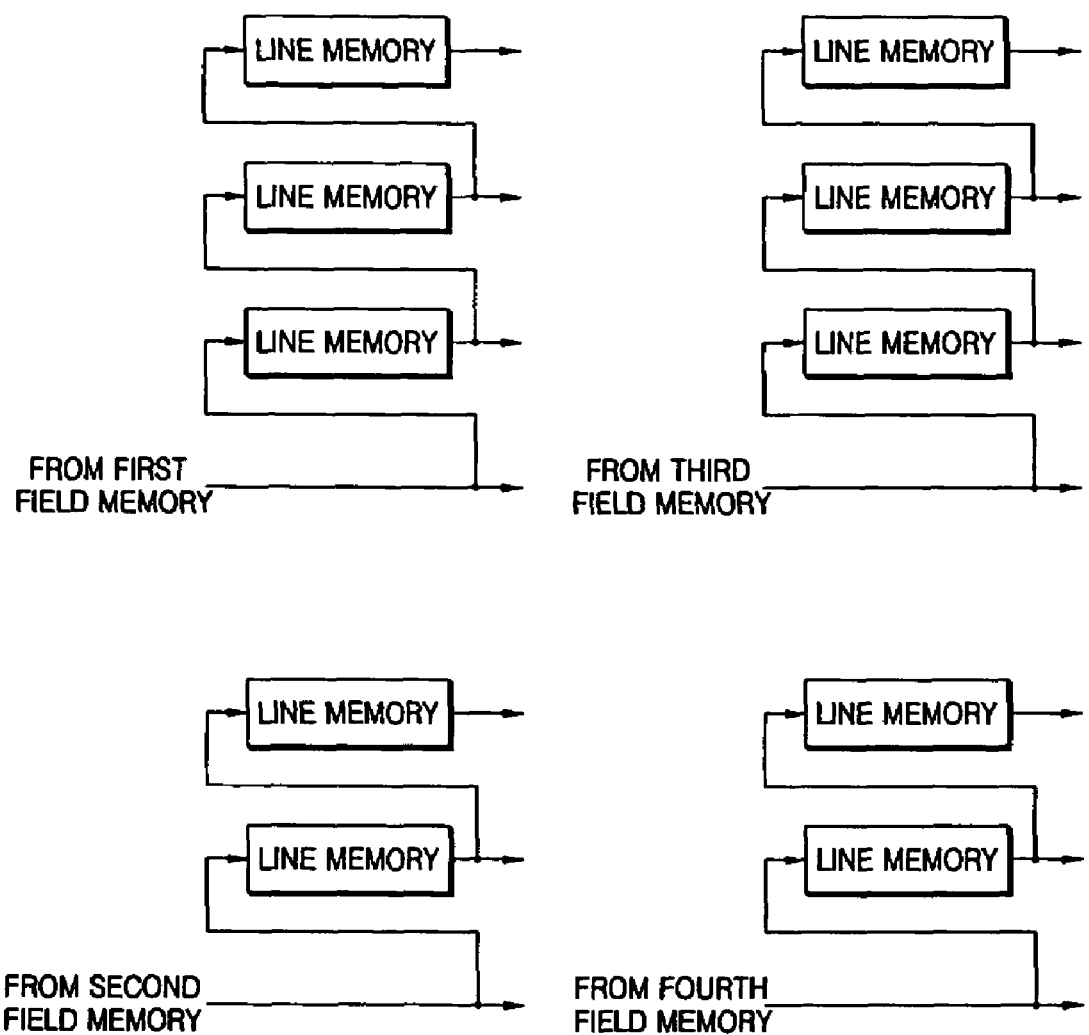
FIGS. 3A through 3C are views illustrating a configuration of line memories, arrangement of the line memories, and a relationship between the arrangement of the line memories and images, respectively, according to an embodiment of the present general inventive concept.
Figure 3B:
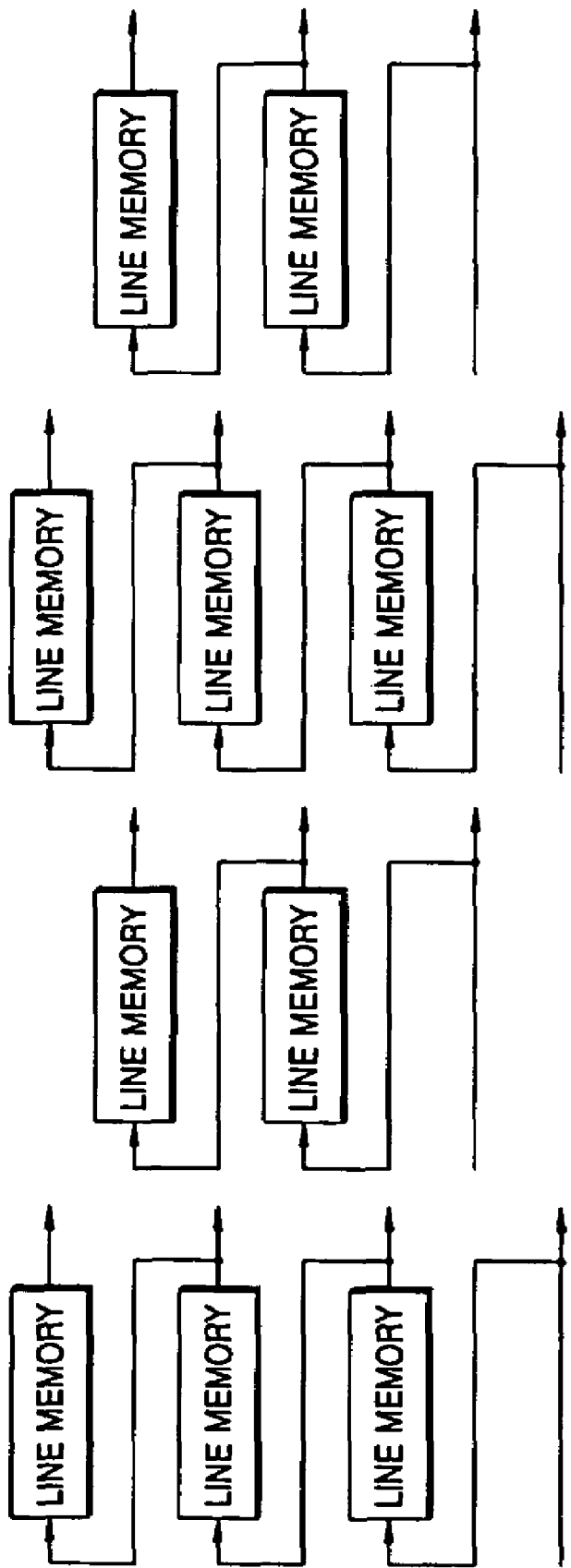
Figure 3C:
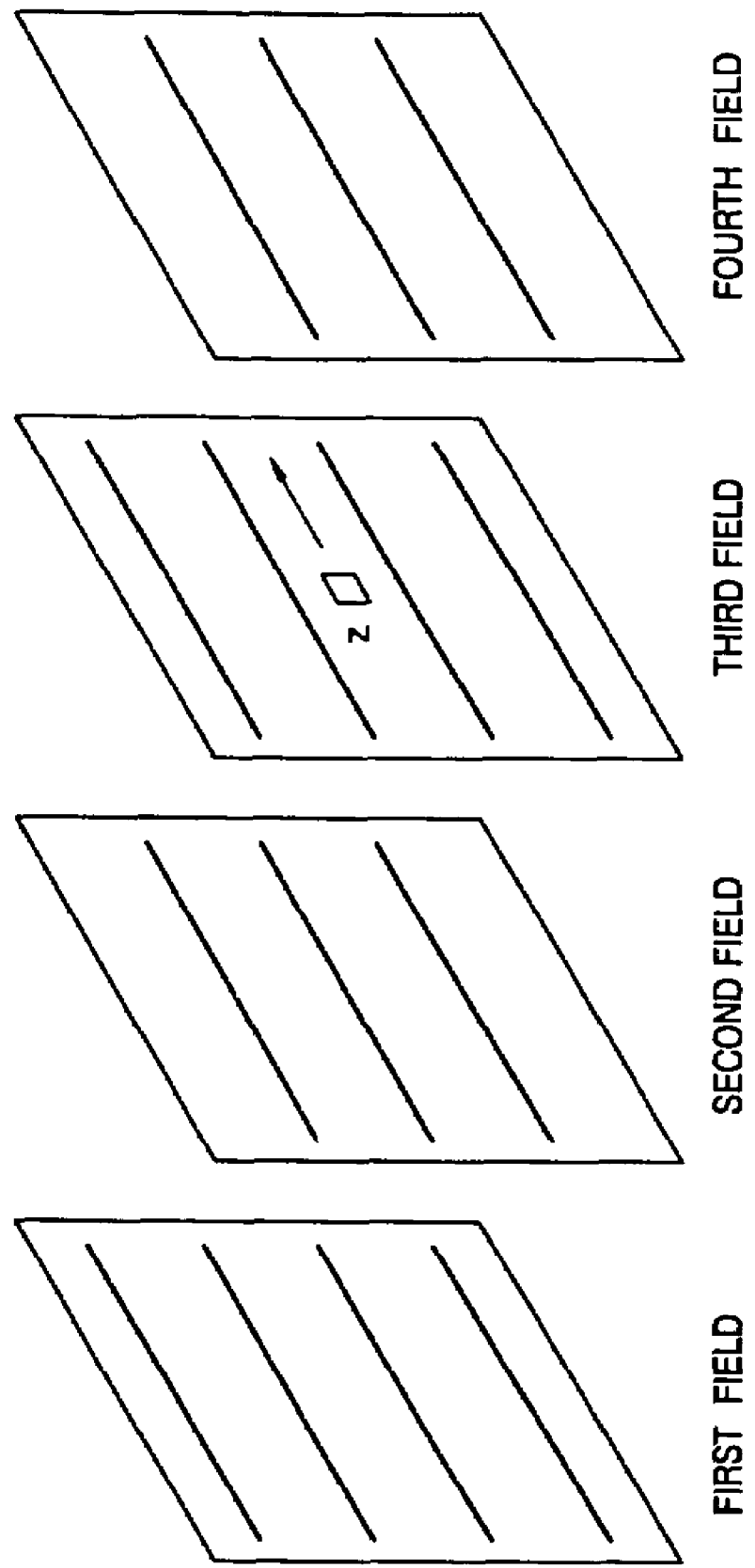

FIGS. 3A through 3C illustrate a configuration of the line memories of the line memory unit 200, an arrangement of the line memories, and a relationship between the arrangement of the line memories and images, respectively, according to an embodiment of the present invention.

FIG. 3A illustrates the line memories of the line memory unit 200. FIG. 3B illustrates the arrangement of the line memories. FIG. 3C illustrates fields corresponding to the arrangement of the line memories illustrated in FIG. 3B.

Referring to FIGS. 3A through 3C, a case where four field memories included in the field memory unit 100, i.e., first through fourth field memories (not shown), and ten line memories included in the line memory unit 200 are used is illustrated as an example to describe operations according to an embodiment of the present general inventive concept. As illustrated in FIG. 3A, the first field memory uses three line memories, the second field memory uses two line memories, the third field memory uses three line memories, and the fourth field memory uses two line memories.

Figure 4:
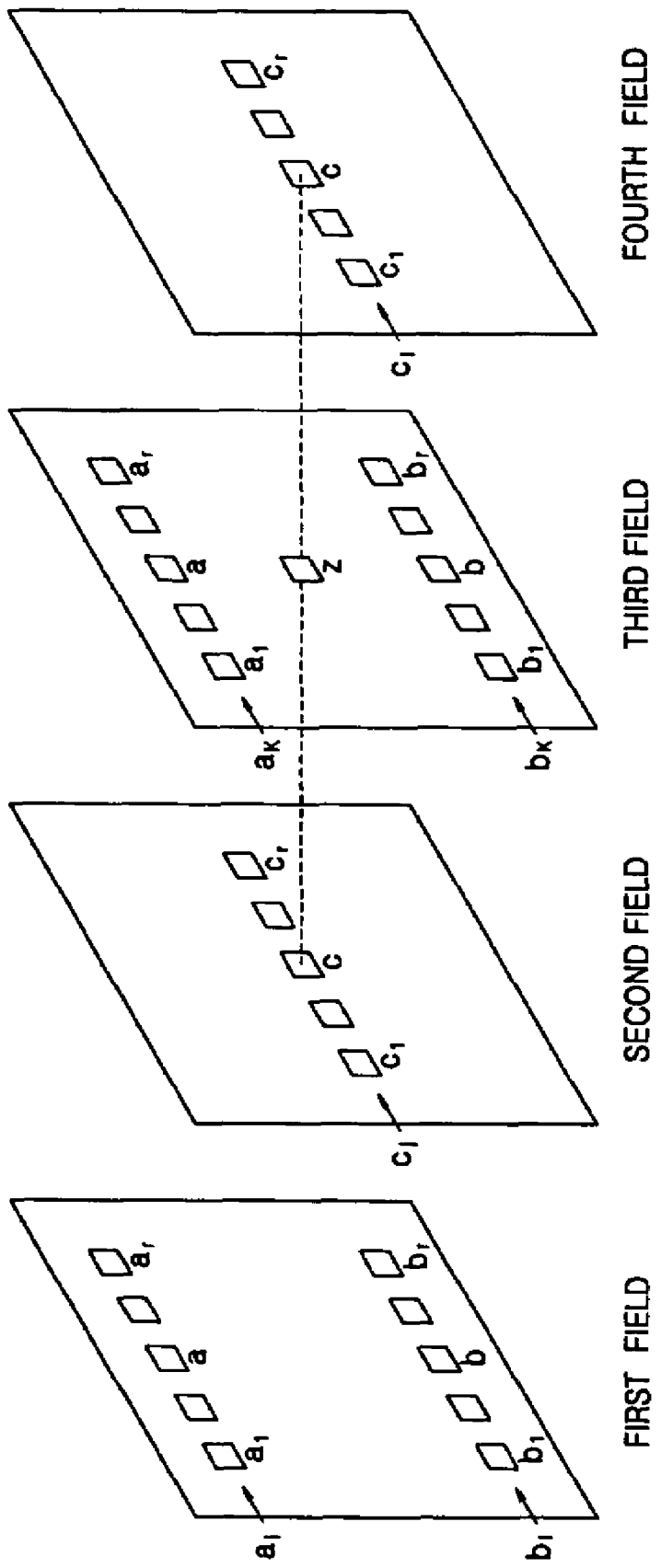
FIG. 4 is a view illustrating operations of a still image detection unit and a pixel insertion unit according to an embodiment of the present general inventive concept.

FIG. 4 is a view illustrating operations of the still image detection unit 310 and the pixel insertion unit 410 according to an embodiment of the present general inventive concept. Here, a pixel z of a third field is to be interpolated.

Referring to FIGS. 2-4, the still image detection unit 310 calculates correlations between fields (a first field, a second field, and a fourth field) including a plurality of pixels that temporally and spatially surround the pixel z and a field (the third field) including the pixel z to be interpolated to detect whether the pixel z is in the static area of the image.

For example, when pixels included in a line $a_i$ of the first field and pixels included in a line $a_k$ of the third field have the same pixel value, pixels included in a line $b_i$ of the first field and pixels included in a line $b_k$ of the third field have the same pixel value, and pixels included in a line $c_j$ of the second field and pixels included in a line $c_t$ of the fourth field have the same pixel value, the still image detection unit 310 determines that the pixel z is in the static area of the image.

When the still image detection unit 310 determines that the pixel z is in the static area of the image, the pixel insertion unit 410 inserts one of a pixel value of a corresponding pixel c of the second field, a pixel value of a corresponding pixel c of the fourth field, and a mean of the pixel values of the corresponding pixels c of the second field and the fourth field as a pixel value of the pixel z. Insertion of the pixel value of the corresponding pixel c of the second field as the pixel value of the pixel z may be more accurate than insertion of the pixel value of the corresponding pixel c of the fourth field. This is because it is determined whether movement occurs between the first field and the third field based on correlations between the pixels included in the lines $a_i$ and $b_i$ of the first field and the pixels included in the lines $a_k$ and $b_k$ of the third field, respectively, when the still image detection unit 310 detects whether the pixel z is in the static area of the image. When noise exists in the image, insertion of the mean of the pixel values of the corresponding pixels c of the second field and the fourth field may provide better image quality when compared to insertion of the pixel value of one of the corresponding pixel c of the second field and the corresponding pixel c of the fourth field. In some cases, the pixel z of the third field may be interpolated, additionally using a future field, i.e., a fifth field (not shown). In this case, it is possible to determine whether the pixel z is in the static area of the image based on correlations between the future field and the other fields and accurately determine whether there is a scene change in the current field when a scene change occurs in future fields following the fourth field.

Figure 5:
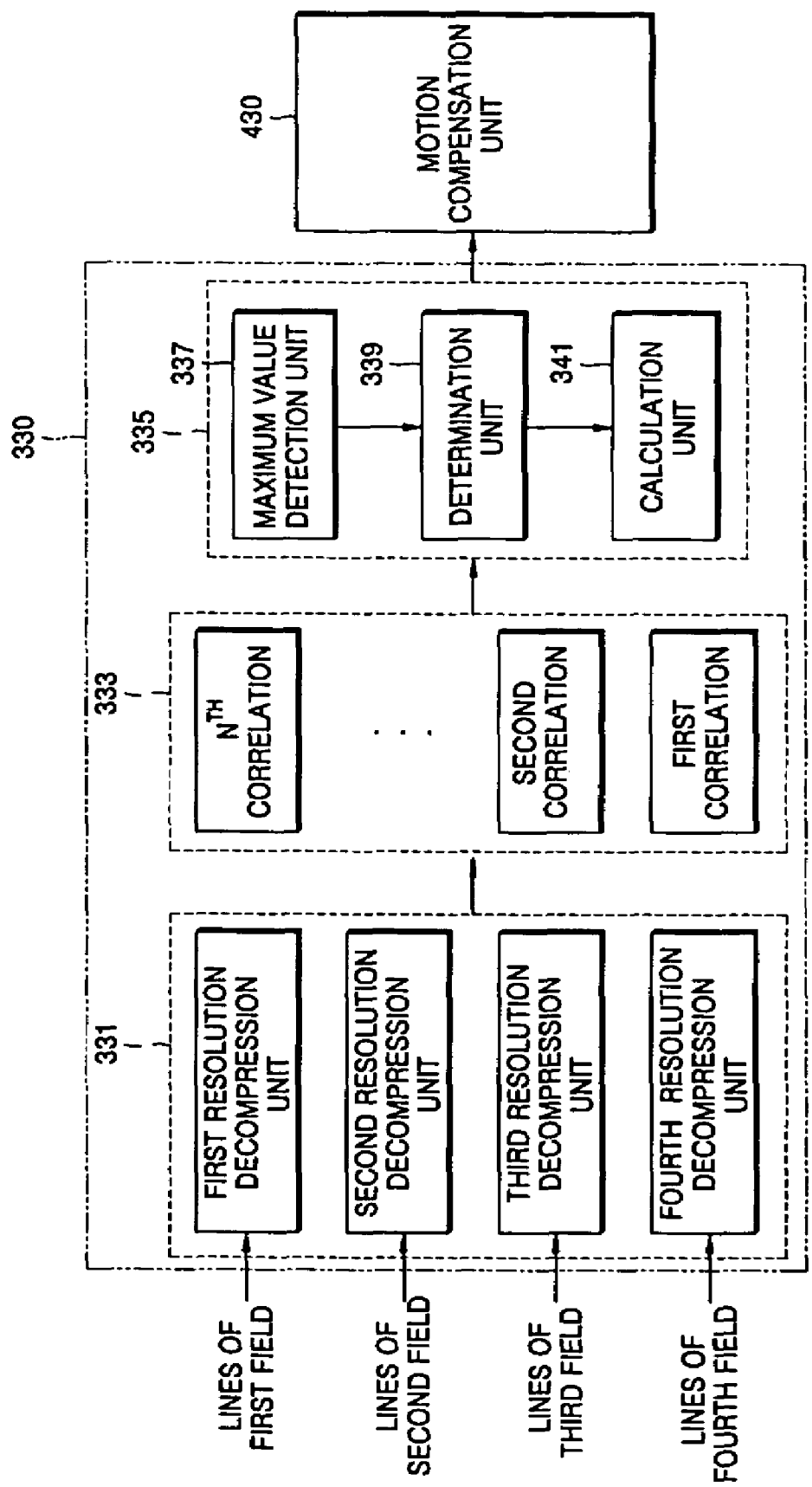
FIG. 5 is a view illustrating operations of a motion estimation unit according to an embodiment of the present general inventive concept.

FIG. 5 is a view illustrating operations of the motion estimation unit 330 according to an embodiment of the present general inventive concept.

The motion estimation unit 330 estimates motion based on the video information stored in the line memory unit 200, and lines used to estimate motion are extracted from the consecutive fields as illustrated in FIGS. 3C and. 4. This configuration is useful for estimation with respect to the horizontal motion or the vertical slow motion.

Referring to FIG. 5, the motion estimation unit 330 includes a resolution decompression unit 331, a correlation detection unit 333, and a motion generation unit 335. The motion generation unit 335 includes a maximum value detection unit 337, a determination unit 339, and a calculation unit 341. The motion estimation unit 330 searches for a pixel that matches best with a pixel to be interpolated from pixels in a current field including the pixel to be interpolated and other fields by calculating a difference between pixel data of the fields, and detects the direction in which the best matching pixel moves through a motion vector.

First, the resolution decompression unit 331 decompresses video information received from the line memory unit 200 that stores the input video information into an image having various resolution levels. Here, a resolution of an image can be gradually reduced using a Gaussian Pyramid, and a high-resolution image can be decompressed into images having low resolution levels. Also, a resolution of an entire field is not decompressed, but instead a resolution of only several lines stored in the line memory unit 200 is decompressed, thereby reducing an amount of computation.

The correlation detection unit 333 detects correlations between low-resolution images of the current field and the other fields using a decompression result of the resolution decompression unit 331. Thus, by detecting correlations between the low-resolution images, an amount of searching can be reduced.

The maximum value detection unit 337 estimates motion information of the current field using a maximum correlation value among correlations detected by the correlation detection unit 333. In other words, a motion vector between the current field and a field having the maximum correlation with the current field is estimated.

The determination unit 339 determines whether the motion information estimated by the maximum value detection unit 337 is accurate. Since the motion information estimated using the field having the maximum correlation with the current image might be inaccurate when the current field has the vertical fast motion, the determination unit 339 determines whether the estimated motion information is accurate. This determination is performed by comparing a brightness value of a pixel to be interpolated with brightness values of pixels surrounding a corresponding pixel of the field having the maximum correlation with the current field. In other words, when the pixels surrounding each of the pixels of the image having the maximum correlation have similar brightness values, the image has no vertical fast motion and the estimated motion vector is determined to be accurate.

When the estimated motion vector is determined to be accurate, the motion information estimated by the maximum value detection unit 337 is determined to be accurate. The determined motion information is output to the motion compensation unit 430. On the other hand, when the estimated motion information is determined to be inaccurate, the switching unit 500 causes the motion compensation unit 430 of the interpolation unit 400 not to operate. That is, the switching unit 500 causes the motion compensation unit 430 not to perform interpolation using the motion information estimated by the motion estimation unit 330.

When the determination unit 339 determines that the motion information estimated by the maximum value detection unit 337 is accurate, the calculation unit 341 calculates second motion information that is more accurate than the estimated motion information. In other words, the calculation unit 341 calculates the degree of motion in units of a real number instead of an integral number to allow more accurate interpolation to be performed using the calculated motion information. If necessary, the calculation unit 341 calculates more accurate motion than the motion information estimated by the maximum value detection unit 337, thereby estimating the second motion information in multiple stages as the motion information in the original image.

Figure 6:
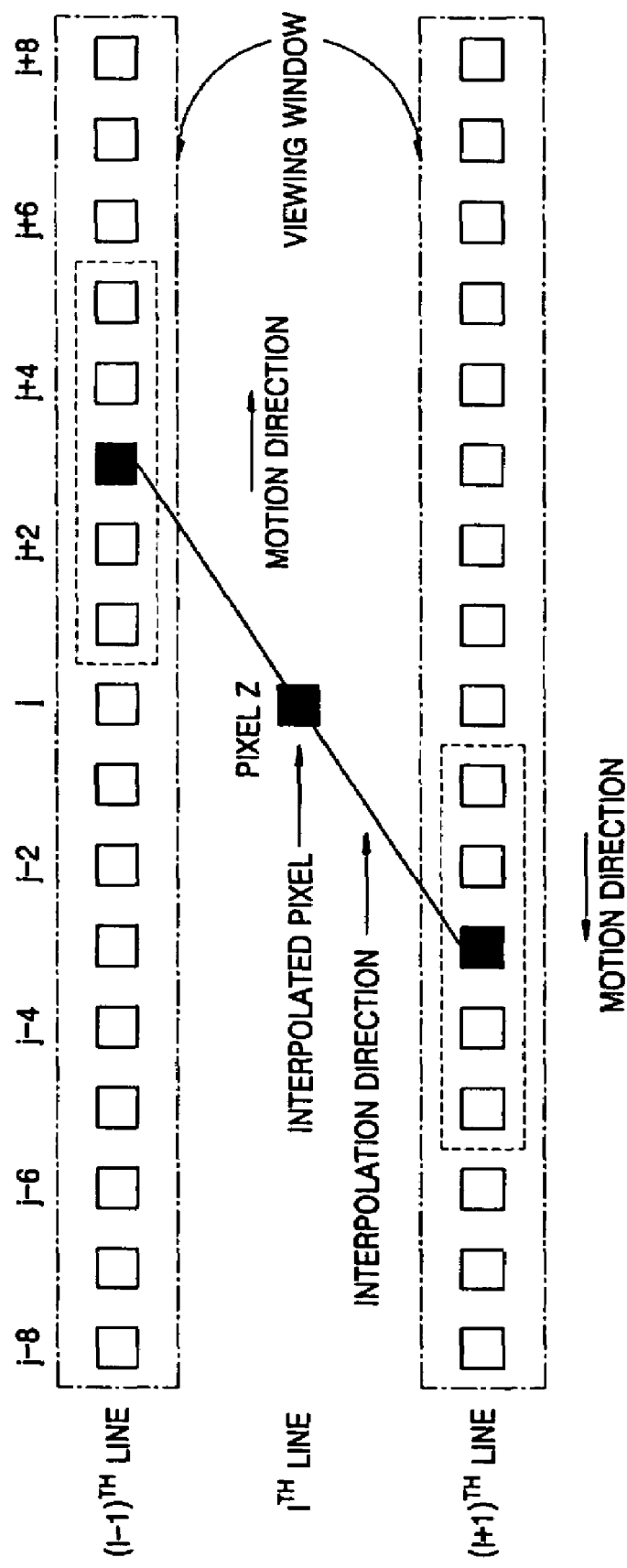
FIG. 6 is a view illustrating operations of a spatial interpolation unit according to an embodiment of the present general inventive concept.

FIG. 6 is a view illustrating operations of the spatial interpolation unit 450 according to an embodiment of the present general inventive concept.

The spatial interpolation unit 450 performs interpolation using an image of a current field including a pixel to be interpolated without using an image of a previous or next field of the current field. This is because interpolation is performed by the spatial interpolation unit 450 when the determination unit 339 of the motion estimation unit 330 determines that the motion information estimated by the maximum value detection unit 337 using the image of the previous or next field is not accurate. When an image has the vertical fast motion, accurate interpolation cannot be made using the motion vector estimated using the image of the previous or next field.

The spatial interpolation unit 450 detects the existence of an edge and an edge direction. When the edge exists, the spatial interpolation unit 450 performs interpolation along the edge direction. When it is difficult to determine whether the edge exists, the spatial interpolation unit 450 may perform interpolation in a vertical direction.

Referring to FIG. 6, the spatial interpolation unit 450 detects the existence of the edge and the edge direction based on distributions in left and right pixels of a pixel corresponding to a pixel z to be interpolated in an $(i-1)^{th}$ line above an $i^{th}$ line including the pixel z and left and right pixels of a pixel corresponding to the pixel z in an $(i+1)^{th}$ line below the $i^{th}$ line and correlations between pixels of the $(i-1)^{th}$ line and the $(i+1)^{th}$ line, which face the pixel z. In other words, the existence of the edge is detected by determining whether there is a sharp change in a pixel value in the left and right pixels of the $(i-1)^{th}$ line and the $(i+1)^{th}$ line. When the correlations and the distributions are high, the edge exists and thus interpolation is performed along the edge direction. However, when the distributions and the correlations between the left and right pixels of the $(i-1)^{th}$ line and the $(i+1)^{th}$ line are similar, it may be difficult to determine whether the edge exists, and thus interpolation may be performed in the vertical direction instead of the edge direction.

Figure 7:
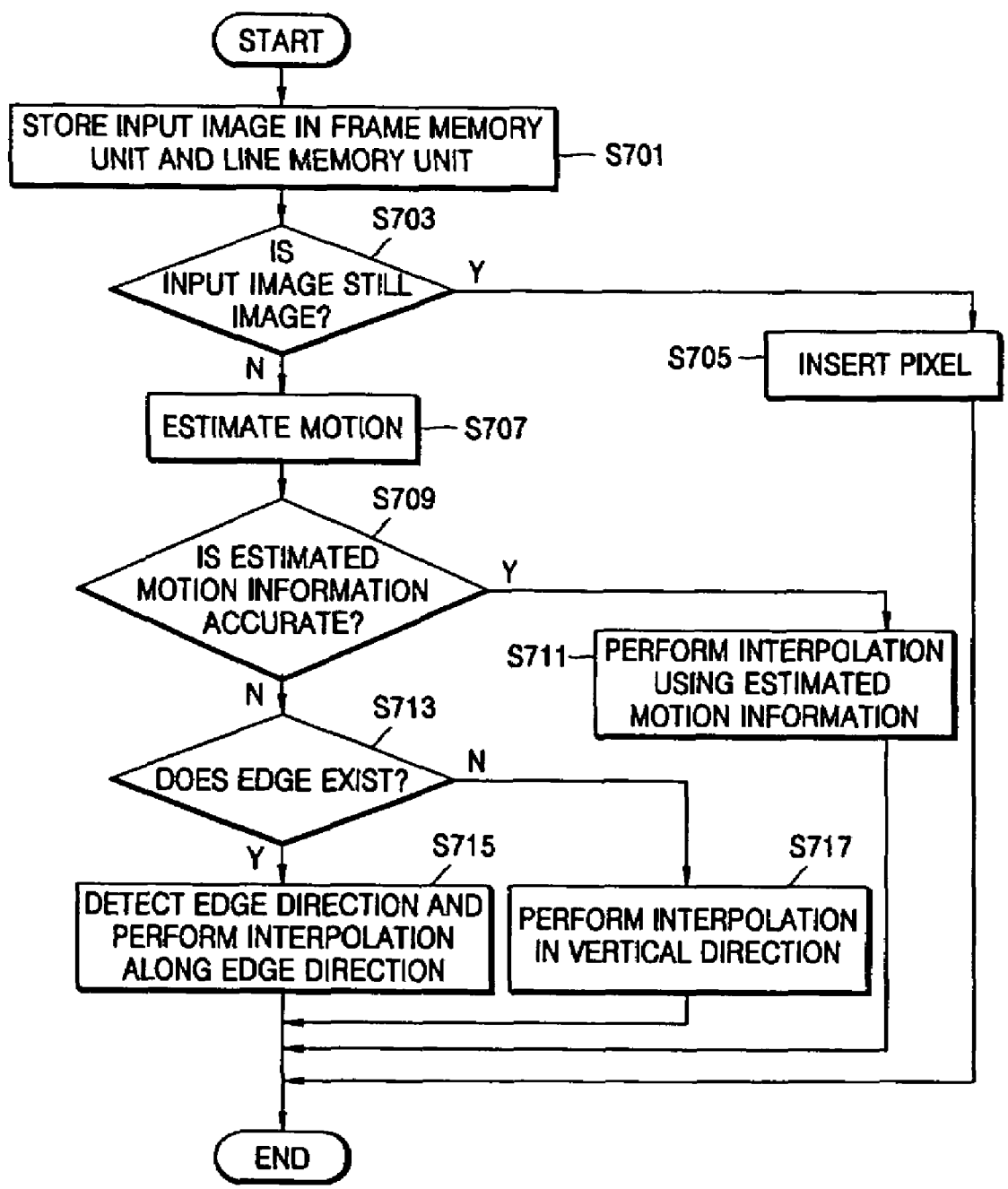
FIG. 7 is a flowchart illustrating a method of motion-compensation adaptive deinterlacing according to an embodiment of the present general inventive concept.

FIG. 7 is a flowchart illustrating a method of motion-compensation adaptive deinterlacing according to an embodiment of the present general inventive concept.

Referring to FIGS. 2 through 7, the input image is stored in the field memory unit 100 and the line memory unit 200 at operation S701. The video information stored in the line memory unit 200 is used to determine whether the pixel to be interpolated is in the static area of the input image or to estimate motion of the pixel to be interpolated.

The still image detection unit 310 determines whether the pixel to be interpolated is in the static area of the input image at operation S703. When the still image detection unit 310 determines that the pixel to be interpolated is in the static area of the input image, the pixel value of the corresponding pixel of the previous or the next field with respect to the current field including the pixel to be interpolated is inserted as the pixel value of the pixel to be interpolated at operation S705. As illustrated in FIG. 4, the pixel insertion unit 410 inserts the pixel value of the corresponding pixel of the previous or next field with respect to the current field including the pixel to be interpolated or the mean of the pixel values of the pixels of the previous and next fields as the pixel value of the pixel to be interpolated. Insertion of the mean of the pixel values of the pixels of the previous and next fields as the pixel value of the pixel to be interpolated can be used in the case of an image having noise.

When the still image detection unit 310 determines that the pixel to be interpolated is not in the static area of an image, the motion estimation unit 330 estimates motion in the image at operation S707. That is, when the still image detection unit 310 determines that the pixel to be interpolated is not in the static area of an image, the switching unit 500 causes the motion estimation unit 330 to operate, i.e., estimate motion of the image.

The resolution decompression unit 331 of the motion estimation unit 330 decompresses resolutions of several lines of several fields into multiple levels to create the low-resolution images, and the correlation detection unit 333 detects correlations between the low-resolution images. The maximum value detection unit 337 of the motion estimation unit 330 detects the low resolution image having the maximum correlation among the detected correlations and estimates the motion vector between the low-resolution images.

The determination unit 339 determines whether the estimated motion information is accurate at operation S709. This determination is performed by comparing the brightness value of the pixel to be interpolated with brightness values of pixels surrounding the corresponding pixel of the field having the maximum correlation with the current field. When the pixels surrounding each of the pixels of the image having the maximum correlation have similar brightness values, the maximum value detection unit 337 determines that the estimated motion vector is accurate. When the image has the large vertical motion, even though the images have the maximum correlation, the maximum correlation is a relative value. Thus, the motion vector between the images having the maximum correlation detected by the maximum value detection unit 337 may not be accurate.

When the estimated motion information is determined to be accurate, interpolation is performed using the motion information estimated by the motion estimation unit 330 at operation S711. That is, when the determination unit 339 of the motion estimation unit 330 determines that the motion information estimated by the maximum value detection unit 337 is accurate, the switching unit 500 causes the motion compensation unit 430 of the interpolation unit 400 to perform interpolation according to information provided from the motion estimation unit 330. To obtain more accurate motion information, the calculation unit 341 of the motion estimation unit 330 calculates the more accurate degree of motion.

On the other hand, when it is determined that the estimated motion estimation is not accurate, it is determined whether the edge exists at operation S713. The existence of the edge is detected based on distributions in left and right portions of the pixel corresponding to the pixel to be interpolated in the line above the line including the pixel to be interpolated and left and right portions of the pixel corresponding to the pixel to be interpolated in the line below the line including the pixel to be interpolated and correlations between the portions of the lines above and below the line including the pixel to be interpolated, which face the pixel to be interpolated.

When it is determined that the edge exists, the edge direction is detected and interpolation is performed along the detected edge direction at operation S715.

On the other hand, when it is difficult to determine whether the edge exists, interpolation is performed in the vertical direction with respect to the pixel to be interpolated at operation S717.

As described above, according to embodiments of the present general inventive concept, a motion adaptive deinterlacing algorithm is used when a pixel to be interpolated is in a static area of an image and a motion-compensation deinterlacing algorithm is used using line memories used in motion adaptive deinterlacing when an image has a horizontal motion or a vertical slow motion, thereby facilitating hardware implementation in comparison to conventional motion-compensation deinterlacing and providing high video quality in comparison to conventional motion adaptive deinterlacing.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A motion-compensation adaptive deinterlacing apparatus, comprising:
    a still image detection unit to detect whether an input image is a still image;
    a motion estimation unit to estimate motion information of a pixel to be interpolated of the input image when the input image is not a still image, the motion estimation unit having:
        a resolution decompression unit to decompress resolutions of a line of the reference field including the pixel to be interpolated and lines of the previous and next fields with respect to the reference field;
        a correlation detection unit to detect correlations between pixels of the line of the reference field and pixels of the lines of the previous and next fields;
        a maximum value detection unit to detect a maximum correlation among the detected correlations and to estimate a motion vector between pixels having the maximum correlation; and
        a determination unit to determine whether the motion vector estimated during detection of the maximum correlation is accurate motion information;
    a pixel insertion unit to interpolate the pixel to be interpolated using pixels in previous and next fields with respect to a reference field including the pixel to be interpolated when the input image is the still image;
    a motion compensation unit to interpolate the pixel to be interpolated using motion information estimated by the motion estimation unit when the input image is not the still image and has no vertical fast motion;
    a spatial interpolation unit to interpolate the pixel to be interpolated using pixels of the reference field including the pixel to be interpolated when the input image has the vertical fast motion; and
    a switching unit to activate one of the pixel insertion unit, the motion compensation unit, and the spatial interpolation unit according to results from the still image detection unit and the motion estimation unit.

2. The motion-compensation adaptive deinterlacing apparatus of claim 1, wherein the still image detection unit determines that the input image is the still image when pixel values of a first line of the reference field including the pixel to be interpolated and pixel values of second lines of the previous and next fields with respect to the reference field are similar.

3. The motion-compensation adaptive deinterlacing apparatus of claim 1, wherein the motion estimation unit further comprises:
    a calculation unit to calculate the motion vector in units of a more precise number when the determination unit determines that the estimated motion vector is the accurate motion information.

4. The motion-compensation adaptive deinterlacing apparatus of claim 1, wherein the determination unit determines whether the estimated motion vector is the accurate motion information by comparing brightness values of pixels surrounding the pixels having the maximum correlation.

5. The motion-compensation adaptive deinterlacing apparatus of claim 1, wherein the pixel insertion unit inserts one of a pixel value of a first pixel corresponding to the pixel to be interpolated in the previous field with respect to the reference field, a pixel value of a second pixel corresponding to the pixel to be interpolated in the next field with respect to the reference field, and a mean of the pixel values of the first and second pixels as a pixel value of the pixel to be interpolated.

6. The motion-compensation adaptive deinterlacing apparatus of claim 1, further comprising:
    a memory unit including field memories to store field information of the input image and line memories to store line information of the input image.

7. The motion-compensation adaptive deinterlacing apparatus of claim 6, wherein the line information stored in the line memories is provided to the still image detection unit and the motion estimation unit.

8. The motion-compensation adaptive deinterlacing apparatus of claim 1, wherein the still image detection unit calculates correlations between pixels of the reference field and pixels of field surrounding the reference field to determine whether the pixel to be interpolated is in the a static area of the image.

9. The motion-compensation adaptive deinterlacing apparatus of claim 1, wherein the spatial interolation unit detects an edge and an edge direction based on distributions in pixels surrounding a pixel corresponding to the pixel to be interpolated in each line adjacent to a line including the pixel to be interpolated within the reference field, interpolates the pixel to be interpolated in the edge direction when the edge exists, and interpolates the pixel to be interpolated in a vertical direction when the edge does not exist.

10. A method of motion-compensation adaptive deinterlacing, the method comprising:
   detecting whether an input image is a still image using information regarding the input image stored in a memory;
   estimating motion of a pixel of the input image to be interpolated when the input image is not the still image by decompressing resolutions of lines of the reference field including the pixel to be interpolated and the previous and next fields with respect to the reference field and detecting correlations between pixels of the reference field and pixels of the previous and next fields with respect to the reference field using the lines having the decompressed resolutions; and
   interpolating the pixel to be interpolated using one of pixel values of previous and next fields with respect to a reference field including the pixel to be interpolated when the input image is the still image, information regarding the estimated motion when the input image is not the still image and has no vertical fast motion, and pixel values of the reference field when the input image has the vertical fast motion.

11. The method of claim 10, wherein the detecting of whether the input image is the still image comprises:
   comparing pixel values of the reference field including the pixel to be interpolated and the pixel values of the previous and next fields with respect to the reference field; and
   determining that the input image is the still image if the compared pixel values are similar.

12. The method of claim 10, wherein the estimating of the motion of the pixel of the input image to be interpolated comprises:
   detecting a maximum correlation among the detected correlations and estimating a motion vector between pixels having the maximum correlation; and
   determining whether the estimated motion vector estimated is accurate motion information.

13. The method of claim 12, wherein the determining of whether the estimated motion vector is the accurate motion information comprises:
   comparing brightness values of pixels surrounding the pixels having the maximum correlation.

14. The method of claim 10, wherein the pixel values of the previous and next fields with respect to the reference field comprise one of a pixel value of a first pixel corresponding to the pixel to be interpolated in the previous field with respect to the reference field, a pixel value of a second pixel corresponding to the pixel to be interpolated in the next field with respect to the reference field, and a mean of the pixel values of the first pixel and the second pixel.

15. The method of claim 10, wherein the interpolating of the pixel to be interpolated with the interpolation value obtained by using the pixel values of the reference field comprises:
   determining whether an edge exists by detecting a degree of change in pixel values of left and right portions of a pixel corresponding to the pixel to be interpolated in a line above a line including the pixel to be interpolated and pixel values of left and right portions of a pixel corresponding to the pixel to be interpolated in a line below the line including the pixel to be interpolated; and
   performing interpolation along an edge direction when the edge exists and performing interpolation in a vertical direction when the edge does not exist.

* * * * *